H. D. COCO.
RAILWAY JOINT.
APPLICATION FILED AUG. 5, 1918.
1,323,156.
Patented Nov. 25, 1919.
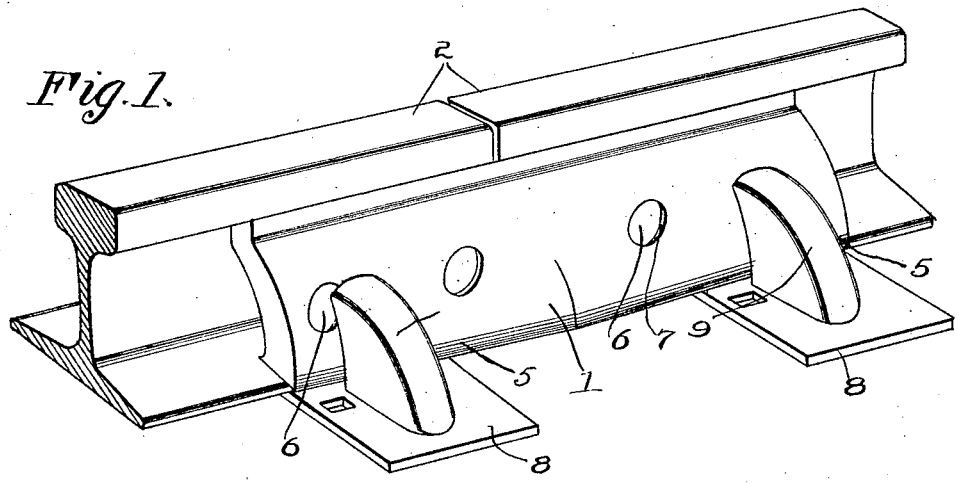
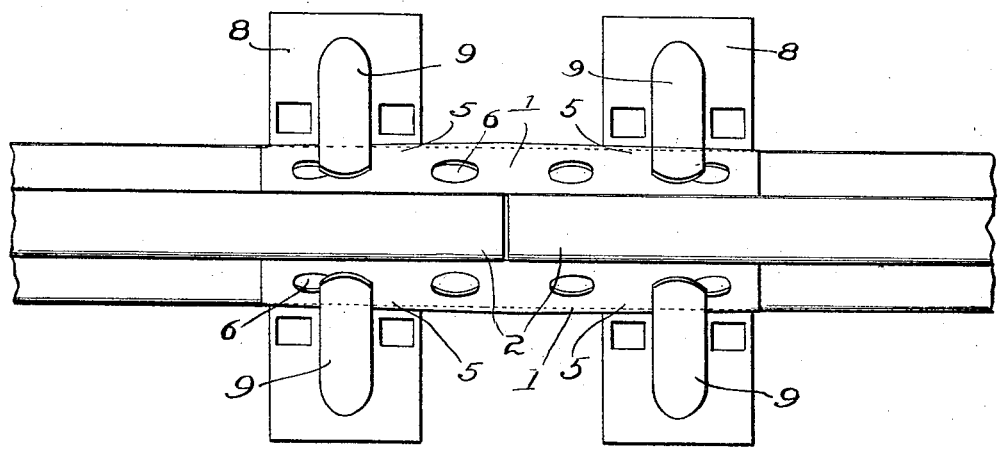
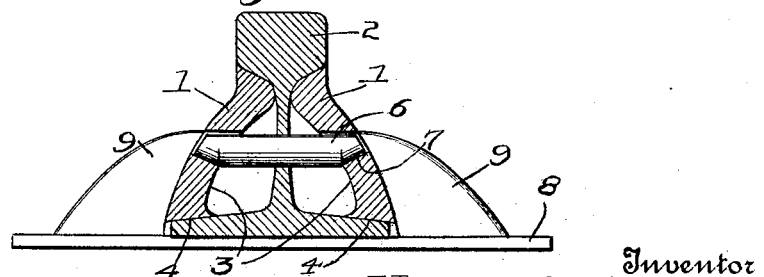
Witnesses
R. A. Thomas
Inventor
Horace D. Coco
By Victor J. Evans
Attorney

UNITED STATES PATENT OFFICE.

HORACE D. COCO, OF HAMBURG, LOUISIANA.

RAILWAY-JOINT.

1,323,156.     Specification of Letters Patent.     Patented Nov. 25, 1919.

Application filed August 5, 1918. Serial No. 248,446.

*To all whom it may concern:*

Be it known that I, HORACE D. COCO, a citizen of the United States, residing at Hamburg, in the parish of Avoyelles and State of Louisiana, have invented new and useful Improvements in Railway-Joints, of which the following is a specification.

This invention relates to improvements in railway joints and especially with reference to the provision of fish plates and base plates or chairs of an improved construction by means of which the ends of railway rails can be securely fastened together and prevented from becoming depressed and forming a low joint.

With the above and other objects in view, the invention consists in the construction, combination and arrangement of devices hereinafter described and claimed.

In the accompanying drawings:—

Figure 1 is a perspective view of a railway joint embodying fish plates and base plates constructed and arranged in accordance with my invention.

Fig. 2 is a plan of the same.

Fig. 3 is a vertical transverse sectional view of the same.

In accordance with my invention, I provide fish plates 1 for arrangement on opposite sides of the meeting ends of the rails 2 and for arrangement between the base flanges and heads of the rails, said fish plates being arcuate in form transversely so that they are hollow on the inner side as at 3 and are provided with the beveled lower edges 4 which fit snugly on the correspondingly inclined upper sides of the rail bases. The fish plates are narrowed slightly toward either end so that they are somewhat tapered, as at 5, and each fish plate is provided with alined openings 7 through which headless studs 6 are passed, the said studs being slightly tapered toward their outer ends.

I also provide base plates 8 which are secured by spikes on the ties and pass under the rails and are provided on their upper sides with integral lugs 9 which fit on opposite sides of the rail bases and the fish plates. Owing to the slightly longitudinally tapered shape of the fish plates the base plates can be driven toward each other by maul or the like and caused to become tightly wedged on the ends of the fish plates so that the base plates with their lugs press the ends of the fish plates inwardly toward each other and on opposite sides of the rails and hence the rails are firmly clamped between the fish plates and there is no danger of the rails spreading and moreover the fish plates are held so firmly engaged between the heads and bases of the rails that the rail ends cannot become depressed and hence a low joint is entirely avoided under all circumstances.

By first drawing the spikes and then driving the base plates beyond the ends of the fish plates the latter can be removed as will be understood. The studs with which the fish plates are provided do not project beyond or present any obstructions whatever on the outer side of the fish plates, which is a great advantage, and moreover inasmuch as I am enabled to entirely dispense with the use of bolts the joints require practically no attention.

While I have herein shown and described a preferred embodiment of my invention, I would have it understood that changes may be made in the form, proportion and construction of the several parts within the scope of the appended claim without departing from the spirit of my invention.

Having thus described my invention, I claim:—

In a rail joint, in combination with the meeting ends of rails, of fish plates at the opposite sides of the rails, said plates and web of the rails having a plurality of alined openings, pins passed through said openings, each pin being slightly tapered at one side toward its opposite ends so that the pins are held from passing through said openings of the fish plates, a base extending under the rails, and fixed lugs arising from the base at opposite sides of the rails, and arranged to hold the fish plates operatively associated.

In testimony whereof I affix my signature.

HORACE D. COCO.